United States Patent
Medina et al.

(10) Patent No.: US 10,933,979 B2
(45) Date of Patent: Mar. 2, 2021

(54) ACTUATOR CONTROL VALVE ARRANGEMENT

(71) Applicant: Goodrich Actuation Systems SAS, Buc (FR)

(72) Inventors: Raphael Medina, Écouen (FR); Gregory Meignat, St Germain en Laye (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 0 days.

(21) Appl. No.: 16/704,037

(22) Filed: Dec. 5, 2019

(65) Prior Publication Data
US 2020/0255125 A1  Aug. 13, 2020

(30) Foreign Application Priority Data
Feb. 11, 2019  (EP) .................................... 19305167

(51) Int. Cl.
| F15B 11/12 | (2006.01) |
| B64C 13/44 | (2006.01) |
| F15B 15/20 | (2006.01) |
| F15B 15/24 | (2006.01) |

(52) U.S. Cl.
CPC ............ B64C 13/44 (2013.01); F15B 11/123 (2013.01); F15B 15/204 (2013.01); F15B 15/24 (2013.01)

(58) Field of Classification Search
CPC ........ B64C 13/44; F15B 15/24; F15B 15/204; F15B 11/123; F15B 11/15
See application file for complete search history.

(56) References Cited

U.S. PATENT DOCUMENTS

| 2,665,084 A | 1/1954 | Feeney |
| 3,386,690 A | 6/1968 | Prilliman |
| 3,940,093 A | 2/1976 | Cabriere |
| 5,572,918 A | 11/1996 | Grundke et al. |
| 9,994,304 B2 | 6/2018 | Ito |
| 2016/0096617 A1* | 4/2016 | Ito .................... B64C 13/505 92/51 |

FOREIGN PATENT DOCUMENTS

| DE | 102004044962 A1 | 4/2006 |
| GB | 747507 A | 4/1956 |

OTHER PUBLICATIONS

Extended European Search Report for International Application No. 19305167.9 dated Jul. 29, 2019, 8 pages.

* cited by examiner

*Primary Examiner* — Abiy Teka
(74) *Attorney, Agent, or Firm* — Cantor Colburn LLP

(57) ABSTRACT

A spoiler actuator can be operated by applying high pressure to a first chamber of the actuator on receipt of a command to extend the spoiler; applying high pressure to a second chamber of the actuator on receipt of a command to retract the spoiler; and on failure of a supply of the high pressure actuating an anti-extension valve to prevent extension of the spoiler; disengaging the anti-extension valve to permit extension if pressure applied to the anti-extension valve exceeds a predetermined force of a spring biasing the anti-extension valve to the engaged position, wherein additional force is applied to the anti-extension valve if the spoiler is retracted beyond a neutral position.

5 Claims, 3 Drawing Sheets

ACTUATOR CONTROL VALVE ARRANGEMENT

FOREIGN PRIORITY

This application claims priority to European Patent Application No. 19305167.9 filed Feb. 11, 2019, the entire contents of which is incorporated herein by reference.

TECHNICAL FIELD

The present disclosure relates to valve arrangements for controlling a hydraulic actuator such as for positioning moveable surfaces such as droop spoilers in aircraft.

BACKGROUND

Hydraulic actuators find many applications, particularly in controlling movement of a moveable component. In aircraft, many moveable components and surfaces are moved by means of a hydraulic actuator.

In general terms, a hydraulic actuator comprises a cylindrical housing in which is mounted an axially moveable piston rod. A head of the rod, inside the housing, divides the housing into two chambers each having a fluid port via which pressurised fluid can be injected into the chamber or low pressure fluid exits the chamber, so as to change the relative pressure in the two chambers either side of the piston head, thus causing movement of the piston relative to the housing. A free end of the piston rod that extends out of the housing is attached to a component or surface to be moved. Hydraulic fluid is provided to the actuator, from a hydraulic fluid supply in fluid communication with the interior of the actuator housing via the ports in the housing, to cause the piston rod to extend out of the housing, or hydraulic fluid is withdrawn from the housing to cause the piston rod to retract back into the housing. The movement of the piston rod is determined by the direction or and pressure of the fluid applied to the actuator, which is in response to a control signal.

As the piston rod moves relative to the housing, the moveable component or surface to which it is attached will move accordingly.

To allow both extension of the rod and retraction of the rod, a valve is provided to set the movement to extension or retraction. This may be a servovalve, more specifically an electrohydraulic servovalve (EHSV). The valve is positioned between the hydraulic fluid supply and the actuator and is moveable, in response to an electric control signal, between a first position in which high pressure fluid flows from the supply into one chamber of the actuator housing and low pressure fluid exits from the other chamber, and a second position in which high pressure fluid is injected into the other chamber and withdrawn from the first chamber of the actuator housing. The valve may also have a neutral or closed position in which fluid is neither supplied to nor withdrawn from the actuator housing.

One particular application for hydraulic actuators controlled by an EHSV is in controlling movement of a spoiler on the wing of an aircraft. A spoiler is a moveable surface mounted on an aircraft wing behind the wing flap. When the aircraft is cruising, both the wing flap and the spoiler lay flat along the wing. To reduce aircraft speed, the spoiler is raised upwards relative to the wing.

The spoiler movement is caused by a hydraulic actuator extending as described above.

If electric power is lost when the spoiler is extended, excessive drag could be exerted by the spoiler. Systems are known, therefore, to retract the spoiler to its 'zero' position in the housing in the event of electric power loss. Usually, this is by means of the EHSV being biased to a valve position where the high pressure fluid is provided to the chamber on the piston rod side of the piston head so that the pressure on that side of the head is greater than in the other chamber, causing the piston to retract into the housing. This will be described further below.

Conventionally, a mechanical stop inside the housing stops the piston rod at the zero position.

Problems can also occur in spoiler control if there is a loss of hydraulic power. Here a solution to prevent extension of the actuator, is an anti-extension valve between the EHSV and the actuator that is switched to a pressure relief position when the hydraulic pressure falls below a predetermined pressure (usually 1.2 times a given 'stall' pressure). Again this will be described further below. If the spoiler is extended, and pressure is lost, the spoiler will be retracted by aerodynamic load, and will gradually drop to become aligned with the wing surface until the zero hinge position is reached. It is important to keep the spoiler at this position and prevent a spurious extension.

Most aircraft have a spoiler that operates using a positive stroke of the actuator rod—i.e. for extension of the rod to lift the spoiler. The stroke of the actuator is between a 'zero' position in the housing and an extended position and the control system is biased to return the rod to the zero position.

More recently, some aircraft have incorporated a 'droop' function in the spoiler, using a negative stroke of the piston rod—i.e. further back into the housing than the zero position or, put another way, a stroke moving from the zero position in the opposite direction to the direction moved in the positive stroke for extending the rod.

The droop function is used to lower the spoiler relative to the wing e.g. for high lift manoeuvers or to close a large air gap between the wing flap and the spoiler if the wing flap is extended.

A problem occurs in the area of overlap of the spoiler and the wing flap ranges of motion. If, for example, electrical power driving the spoiler is lost, the spoiler will, under its own weight or under pressure from the EHSV bias, press against the wing flap when not driven by the actuator, thus interfering with movement of the wing flap.

When the spoiler is in the non-overlapped region, the system will have an anti-extension higher than the stall load e.g. 1.2 times the stall load Fstall. This means that the anti-extension mechanism kicks in in the pressure acting on the side opposite the spring is less than 1.2 times Fstall (or other set ant-extension force). However, in the overlapped region, this force can be too high and cause damage to the wing flap. It is therefore desirable that the flap can drive the spoiler with a reduced anti-extension threshold to avoid damage to the wing flap—i.e. the anti-extension mechanism is triggered at a lower force.

The inventors have, however, identified a need to provide a valve assembly that prevents the spoiler and flap from interfering with each other.

SUMMARY

The present disclosure provides an actuator control arrangement comprising: a hydraulic actuator having a housing and a piston rod axially moveable within the housing between a neutral position, a retracted position and an extended position with respect to the housing in response to application of pressure to the piston rod; a solenoid valve arranged between a pressure source and the actuator, the solenoid valve switchable between a first mode and a second mode in response to an electric control signal, wherein, in the first mode, the solenoid valve creates a fluid flow path from the pressure source to the actuator and in the second mode, the solenoid valve creates a fluid flow path to release pressure from the actuator; and an anti-extension valve provided between the pressure source and the actuator, configured to move between a first position in which a fluid path is created between the pressure source and the actuator and a second, anti-extension position to prevent extension of the piston rod with respect to the housing in the event of pressure loss; wherein the anti-extension valve has a first pressure input arranged to receive pressure from the pressure source and a second pressure input arranged to receive pressure from the actuator, the sum of the pressure at the first input and at the second input acting against a spring biasing the anti-extension valve into the second position; and further comprising an outlet port in the actuator housing arranged to be closed when the solenoid valve is in the first position and open when the solenoid valve is in the second position and, when open, to convey pressure from the actuator to a third input of the anti-extension valve to add to the pressure acting against the spring.

Thus, in the case of the piston rod being in negative stroke and in the event of pressure failure, less force is required to disengage the anti-extension function because, the force is doubled when applied to the end of the anti-extension valve acting against the spring bias.

The actuator preferably also includes an electrohydraulic servovalve, EHSV, between the pressure source and the actuator to control the direction of pressurised fluid to the actuator in response to the electric control signal. Preferably, the EHSV is moveable between a first position in which high pressure fluid is directed from the fluid source to a first chamber of the actuator to cause extension of the piston rod and a second position whereby high pressure fluid is directed to a second chamber of the actuator to cause retraction of the piston rod with respect to the housing.

The default position of the EHSV is preferably the second position.

The actuator arrangement is preferably used in a spoiler control arrangement for an aircraft, comprising a spoiler moveable relative to a wing surface and an actuator control arrangement as described above, the actuator arranged to move the spoiler by movement of the piston rod.

BRIEF DESCRIPTION OF THE DRAWINGS

Preferred embodiments will now be described by way of example only and with reference to the drawings.

DETAILED DESCRIPTION

Figure 1:
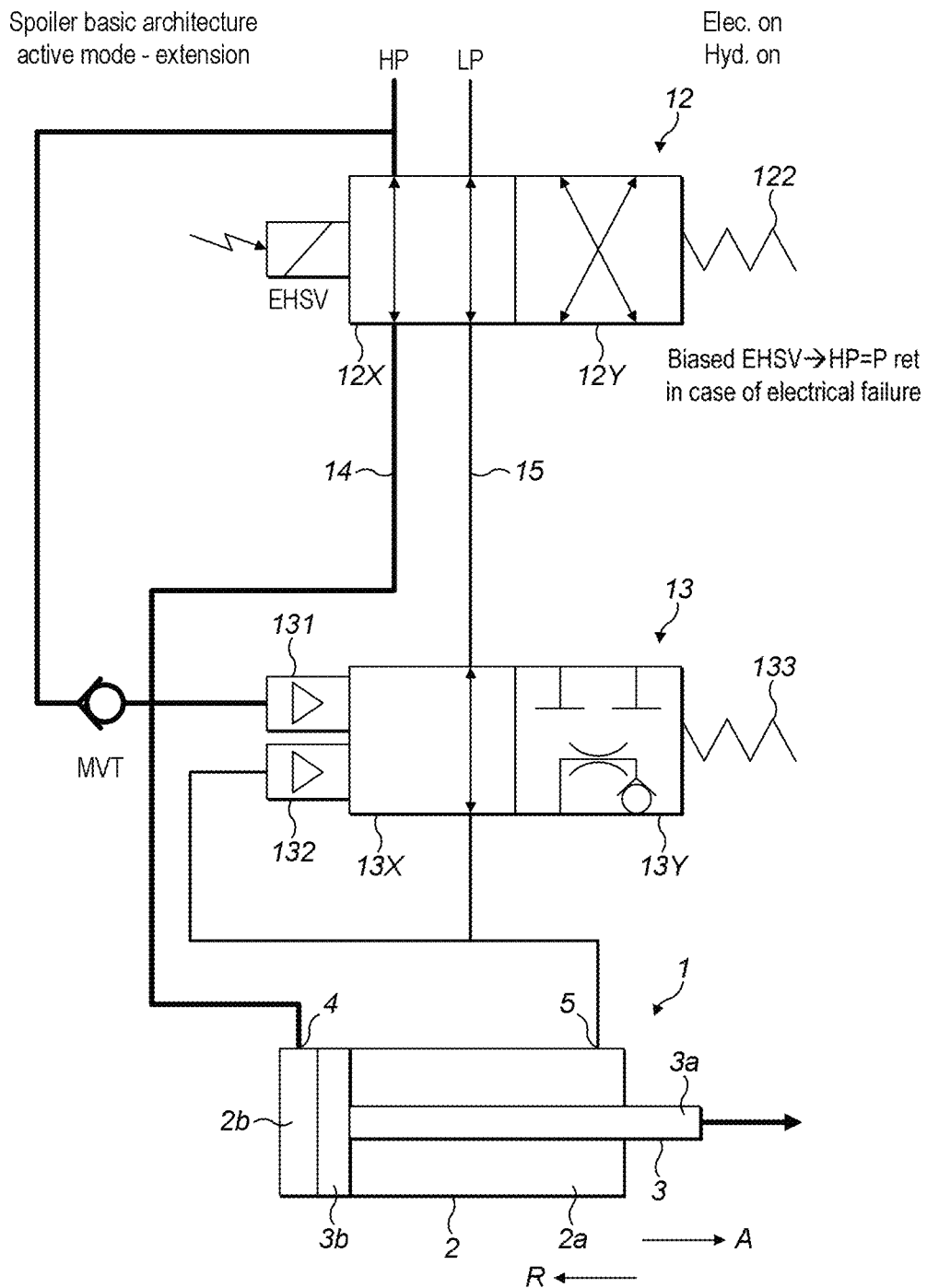
FIG. 1 is a schematic view of a conventional actuator control valve arrangement.

Referring to FIG. 1, a known positive stroke operation of an actuator control valve arrangement will first be described.

FIG. 1 shows a hydraulic actuator 1 comprising a housing 2 and a piston comprising a piston rod 3 axially moveable in the housing 2. Movement of the piston rod 3 relative to the housing 2 is caused by providing pressurised hydraulic fluid from a fluid supply 10 to the actuator 1 via ports 4,5 in the actuator housing 2 in response to an electric control signal. The piston rod has a free end 3a extending out of the housing and for attachment to the surface to be moved by the actuator (not shown). The other end of the piston rod inside the housing 2 has a piston head 3b that extends across the diameter of the housing 2 thus dividing the housing interior into two chambers 2a,2b—one on each side of the piston head 3b.

If the piston rod 3 is to be extended out of the housing 2, high pressure fluid from a source HP fluid is provided via a fluid line 14 into chamber 2b of the housing 2 via port 4 which causes the piston rod to move in the direction of arrow A. Fluid present in chamber 2a is thus forced from the housing 2, as the piston head moves through the housing, on the other side of the piston head, via port 5, on fluid line 15, to a reservoir (not shown) as low pressure (LP) fluid. If the piston rod 3 is to be retracted from the extended position, high pressure fluid is provided to chamber 2a via port 5 causing the piston rod 3 to move in the direction of arrow B and fluid is ejected from chamber 2b via port 4 to the reservoir.

The direction of fluid is controlled by a EHSV valve 12 which takes up different valve positions in response to the electric control signal (not shown). For extending the rod as described above, the EHSV valve is positioned at position 12X i.e. with the lines shown in 12X aligned with the fluid lines from the supply and to the reservoir.

For retraction of the piston rod 3, the fluid lines are reversed by the EHSV valve being at position 12Y. The EHSV may also have a neutral position where there is no fluid flow in either direction. The EHSV valve is preferably biased to position 12Y via EHSV spring 122. Thus, in the event of loss of electric power, the EHSV will revert to position 12Y to avoid extension.

A mechanical stop (not shown) in chamber 2b, stops the retracted rod at the 'zero' position.

To avoid extension of the actuator in the event of loss of hydraulic pressure, an anti-extension valve 13 is provided. The anti-extension valve 13 is usually in position 13X allowing fluid communication between the actuator and the EHSV valve 12, because the fluid pressure provided at ports 131 and 132 together exceed the force of the relief valve spring 133. In the event that of hydraulic failure, there is no pressure at port 131. The pressure created by a tensile load at port 132 is not enough to overcome the bias of the spring 133 and so the spring pushes the anti-extension valve 13 to position 13Y which holds the piston rod at the zero position, preventing extension.

In practice, end 3a of the piston rod 3 is attached to the component or surface to be moved e.g. the spoiler (not shown).

The system is also operable in a droop mode as briefly discussed above where, in response to an electric control signal, through the solenoid valve 140, the actuator piston rod undergoes a negative stroke—i.e. the piston head moves away from the zero position in the opposite direction to when extending (direction B).

The present disclosure is concerned with providing actuator management when the system is in active droop mode but then electric power or hydraulic pressure is lost.

As mentioned above, in extension (positive stroke) mode, when pressure is lost, the anti-extension valve operates to prevent extension of the piston rod, so that the rod is held at the zero position.

As discussed above, if pressure stops being supplied to the actuator, in the droop (negative stroke) mode, the spoiler (or other component) will be stuck in the down position since the anti-extension is activated. This can apply pressure to and interfere with the movement of other components such as a wing flap.

The present disclosure therefore provides a solution which permits the flap load to be reduced to overcome the anti-extension of the spoiler, when in negative stroke. The system applies additional pressure to the anti-extension valve when the spoiler is in negative stroke, so that the anti-extension function is overcome at a lower force than usual.

The solution to this problem will now be discussed with reference to FIGS. 2 and 3.

The actuator 100 corresponds to the actuator 1 described above and has a piston rod 300 axially moveable in a housing 200 due to the action of hydraulic fluid entering or leaving the housing 200 via ports 400,500, the direction of flow being controlled by a three position EHSV valve 120.

A solenoid valve 140 is also provided between the fluid supply (not shown here) and the mode selector valve spool to place the assembly into an active or a damped mode.

In an active, positive stroke mode, where the piston rod 300 is to be extended, operation is as described above (not shown).

The EHSV 120 is in position 12X responsive to the electric control signal. High pressure (HP) fluid is fed into the actuator at port 400 and low pressure (LP) fluid is ejected at port 500. The high pressure fluid is also fed, via the solenoid valve 140 in position 140X, to the anti-extension valve 130. The effect of the high pressure and low pressure lines acting on the anti-extension valve pushes this valve against the force of the spring 600 to position 13X so that the low pressure fluid from port 500 flows to the reservoir (not shown).

If, in normal, positive stroke mode, the pressure fails, the anti-extension valve moves to position 13Y under the force of spring 600. The spring force is set to 1.2 times the stall force. With the anti-extension valve at position 13Y, the piston will not extend.

In the droop, or negative stroke mode, however, in the event of electrical failure, the desire is to return the piston to the neutral position i.e. to move it in the extension direction by a limited amount. In the event of hydraulic failure, the aim is to reduce the load that has to be overcome to drive the spoiler in the non-overlapped region.

The arrangement of this disclosure aims to provide control of the actuator for such an event.

According to this disclosure, a determination is made as to whether the spoiler is in positive or negative stroke according to the control signal provided to the solenoid. In the case of positive stroke, the arrangement is connected as described above, with high pressure applied to the actuator via port 400 and low pressure ejected by the extending piston rod at port 500, and with the anti-extension valve connected as described above to trip to position 13Y if the force on the left side is less than the spring bias set at $1.2*F_{stall}$.

In the case of positive stroke, and pressure fails, a first mode of operation is set whereby the anti-extension valve 130 operates to prevent extension of the spoiler under aerodynamic load e.g. above the wing flap position.

In a system according to the disclosure, the actuator housing includes a port 800 that determines whether the spoiler is in normal mode or droop mode.

Figure 2:
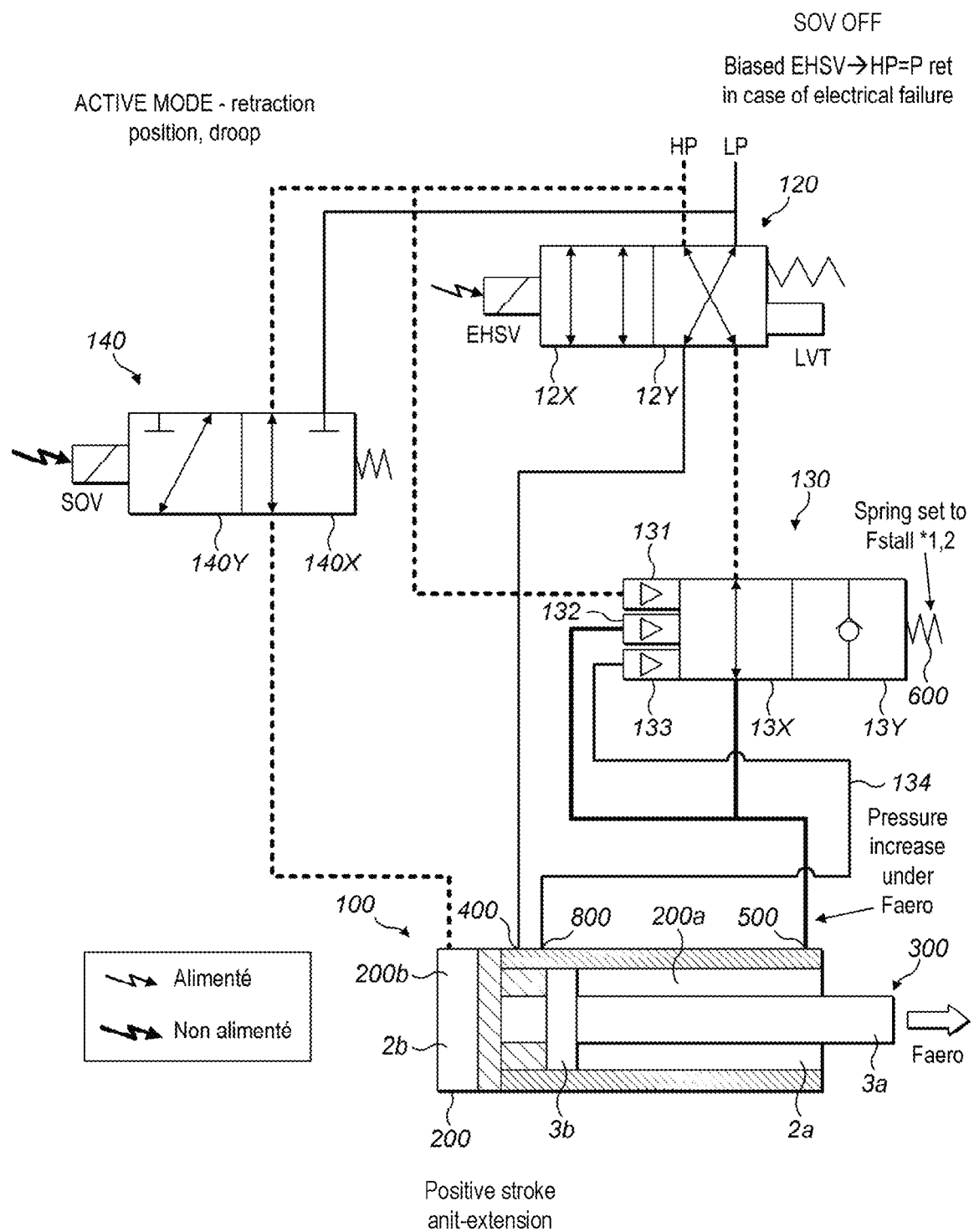
FIG. 2 is a schematic view of an actuator control valve arrangement according to the present disclosure in a first state (non-overlapped region).
Figure 3:
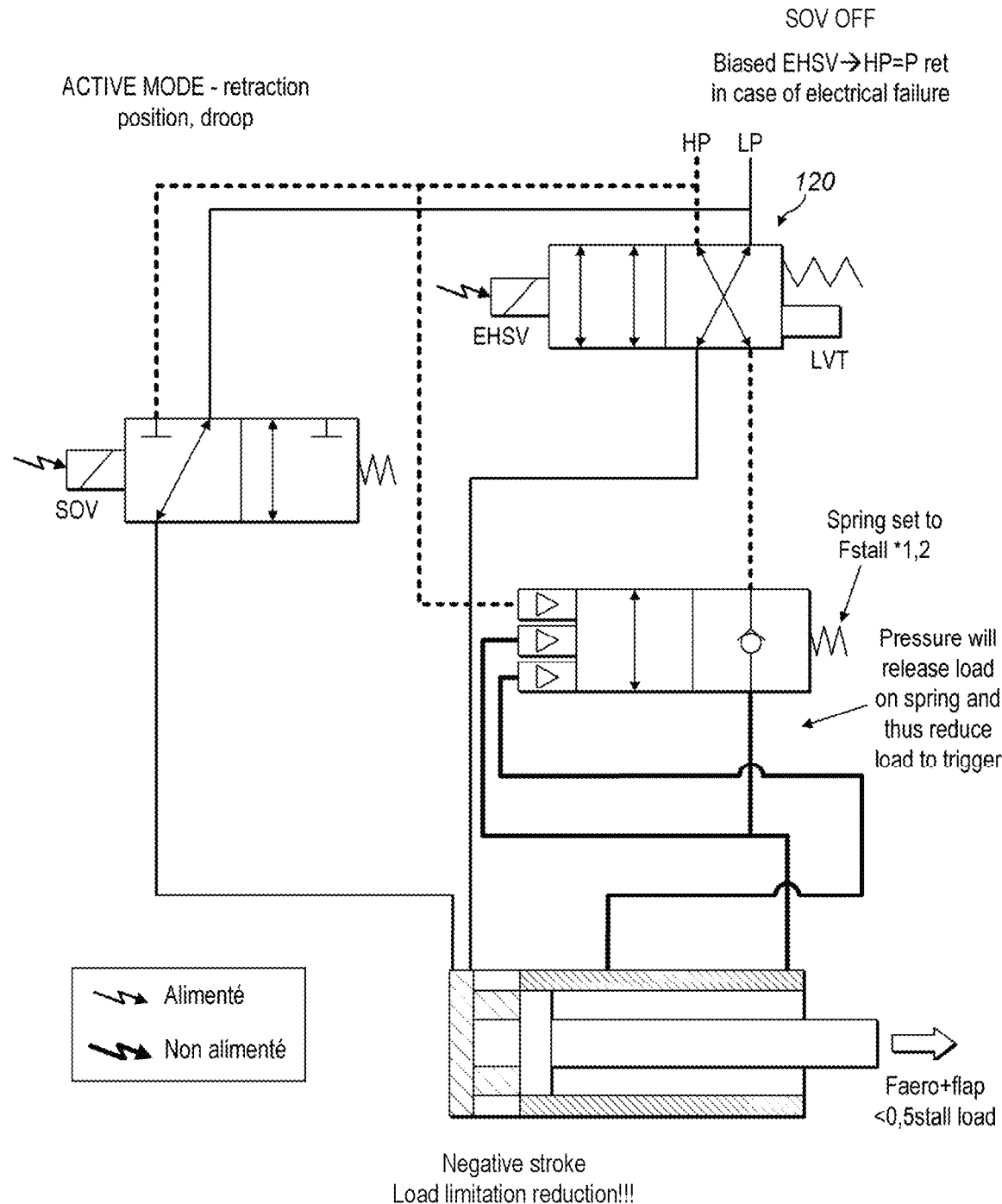
FIG. 3 is a schematic view of an actuator control valve arrangement according to the present disclosure in a second state (overlapped region).

FIG. 2 shows the assembly configuration when the system is active and the piston rod 300 is in a positive stroke. In this case, the positive stroke is detected at port 800 and the solenoid valve 140 is set to the position shown in FIG. 2 to provide fluid communication from the high pressure supply HP to the actuator housing. In positive stroke, port 800 is closed so no additional force is applied to the end of the anti-extension valve 130 at port 133 via the line 134 from port 800. Anti-extension valve is therefore controlled in the usual way to trigger to position 13Y when the pressure acting on the other end is less than $1.2*F_{stall}$. The mode selection valve 130 is biased to the communicating position 13X by means of the spring 600. The spring constant is set to a value of e.g. 1.2 times the force generated to a stall in the system—i.e. Fstall*1.2.

In the event of electrical failure to the EHSV valve, it will be biased to position 12Y (i.e. the piston rod retraction configuration) as shown in FIG. 2.

In the event of a pressure failure (see the dashed lines in FIG. 2) in positive stroke, the port 800 will be closed, as mentioned above. As pressure at port 131 of the anti-extension valve is lost, the valve trips to its ant-extension position 130Y. Aerodynamic force will act on the piston rod 300, which can pull the piston rod. This will increase the pressure in chamber 200a and that pressure is applied to port 132 of the anti-extension valve. So long as this is less than the set force of the spring 600, the anti-extension valve 130 will remain in position 130Y and prevent extension of the rod 300. If the aerodynamic force pulling the rod, and applied to port 132, exceeds the set force of the spring, this will overcome the anti-extension function and push the anti-extension valve to position 130X. The piston rod is then able to extend. In positive stroke, a high force (1.2 times Fstall in this example) is required to overcome the anti-extension.

If the spoiler is in the droop position or negative stroke (FIG. 3), where it could be in contact with and apply pressure to the wing flaps under its own weight, the safety mechanism needs to be set so that the anti-extension valve 130 allows extension of the piston rod, i.e. that the anti-extension function is overcome, at pressures less than 1.2*Fstall, because 1.2*Fstall is too high a pressure to act on the wing flap. In negative stroke, the solenoid valve 140 is switched to a position 140Y in which the actuator and the low pressure reservoir LP are connected via port 400.

In the event of pressure failure in the negative stroke, the spoiler would usually be stuck in this position since the anti-extension function is activated. In such a pressure failure situation (see dashed lines in FIG. 3) the arrangement of this disclosure, however, operates in a second, load limitation reduction mode so that the spoiler can extend at lower forces than for positive stroke. Additional pressure is provided to the anti-extension valve provided at port 133 through port 800. The higher pressure in the chamber to the left of the piston head in FIG. 5 is provided to the ports of the anti-extension valve 130, such that the valve is able to switch out of the anti-extension position 13Y at a lesser force on the piston rod i.e. less than 1.2*Fstall.

In the negative stroke, port 800 is open. Thus, the increased pressure in chamber 200a due to aerodynamic force is provided to both ports 132 and 133 of the anti-extension valve. When the total force at 132 and 133 exceeds the spring force, the anti-extension force is overcome and the anti-extension valve returns to position 130X. It can be seen, therefore, that the anti-extension function is overcome with less (here half) pressure in chamber 200b than when in positive stroke, where port 800 is closed.

Thus in negative stroke, in the event of pressure failure, a higher pressure is required to trigger the anti-extension valve than is required in positive stroke, meaning that extension is permitted in the event of pressure failure.

The invention claimed is:

1. An actuator control arrangement comprising:
   a hydraulic actuator having a housing and a piston rod axially moveable within the housing between a neutral position, a retracted position and an extended position with respect to the housing in response to application of pressure to the piston rod;
   a solenoid valve arranged between a pressure source and the actuator, the solenoid valve switchable between a first mode and a second mode in response to an electric control signal, wherein, in the first mode, the solenoid valve creates a fluid flow path from the pressure source to the actuator and in the second mode, the solenoid valve creates a fluid flow path to release pressure from the actuator;
   an anti-extension valve provided between the pressure source and the actuator, configured to move between a first position in which a fluid path is created between the pressure source and the actuator and a second, anti-extension position to prevent extension of the piston rod with respect to the housing in the event of pressure loss, wherein the anti-extension valve has a first pressure input arranged to receive pressure from the pressure source and a second pressure input arranged to receive pressure from the actuator, the sum of the pressure at the first input and at the second input acting against a spring biasing the anti-extension valve into the second position; and
   an outlet port in the actuator housing arranged to be closed when the solenoid valve is in the first position and open when the solenoid valve is in the second position and, when open, to convey pressure from the actuator to a third input of the anti-extension valve to add to the pressure acting against the spring.

2. The actuator control arrangement of claim 1, further comprising an electrohydraulic servovalve, EHSV, between the pressure source and the actuator to control the direction of pressurised fluid to the actuator in response to the electric control signal.

3. The actuator control arrangement of claim 2, wherein the EHSV is moveable between a first position in which high pressure fluid is directed from the fluid source to a first chamber of the actuator to cause extension of the piston rod and a second position whereby high pressure fluid is directed to a second chamber of the actuator to cause retraction of the piston rod with respect to the housing.

4. The actuator control arrangement of claim 3, wherein a default position of the EHSV is the second position.

5. A spoiler control arrangement for an aircraft, comprising:
   a spoiler moveable relative to a wing surface; and
   an actuator control arrangement as claimed in claim 1, the actuator arranged to move the spoiler by movement of the piston rod.

\* \* \* \* \*